(12) United States Patent
Spigelmyer et al.

(10) Patent No.: US 11,756,520 B2
(45) Date of Patent: Sep. 12, 2023

(54) 2D ULTRASOUND TRANSDUCER ARRAY AND METHODS OF MAKING THE SAME

(71) Applicant: Transducer Works LLC, Centre Hall, PA (US)

(72) Inventors: Matthew Todd Spigelmyer, Spring Mills, PA (US); Erik Stephen Bryant, Reedsville, PA (US)

(73) Assignee: TRANSDUCER WORKS LLC, Centre Hall, PA (US)

( * ) Notice: Subject to any disclaimer, the term of this patent is extended or adjusted under 35 U.S.C. 154(b) by 348 days.

(21) Appl. No.: 15/359,222

(22) Filed: Nov. 22, 2016

(65) Prior Publication Data

US 2018/0143310 A1 May 24, 2018

(51) Int. Cl.
*G10K 11/02* (2006.01)
*B06B 1/06* (2006.01)
*G01S 15/89* (2006.01)

(52) U.S. Cl.
CPC ............ *G10K 11/02* (2013.01); *B06B 1/0622* (2013.01); *G01S 15/8925* (2013.01)

(58) Field of Classification Search
CPC ....... G10K 11/02; B06B 1/0622; B06B 1/067; G01S 15/8925
USPC .................................. 367/152, 153; 310/334
See application file for complete search history.

(56) References Cited

U.S. PATENT DOCUMENTS

| | | | | |
|---|---|---|---|---|
| 4,404,489 A | * | 9/1983 | Larson, III | H01L 41/29 174/254 |
| 5,099,459 A | * | 3/1992 | Smith | B06B 1/0629 29/25.35 |
| 5,410,208 A | * | 4/1995 | Walters | B06B 1/0622 310/334 |
| 5,438,998 A | * | 8/1995 | Hanafy | B06B 1/0622 310/334 |
| 5,592,730 A | * | 1/1997 | Greenstein | B06B 1/0622 29/25.35 |
| 5,640,370 A | * | 6/1997 | Hanafy | B06B 1/0629 310/334 |
| 5,704,105 A | * | 1/1998 | Venkataramani | B06B 1/064 29/25.35 |

(Continued)

FOREIGN PATENT DOCUMENTS

EP   1416255 A1   5/2004

OTHER PUBLICATIONS

International Search Report and Written Opinion corresponding to International Patent Application No. PCT/US2017/062805, dated Feb. 16, 2018, 7 pages.

(Continued)

*Primary Examiner* — Ian J Lobo
(74) *Attorney, Agent, or Firm* — Todd A. Serbin; J. Clinton Wimbish; Maynard Nexsen PC

(57) ABSTRACT

In one aspect, an ultrasound transducer system comprises a two-dimensional array of transducer elements, the transducer elements having a first side comprising individual first electrodes in electrical communication with control circuitry of the ultrasound transducer system. A matching layer is coupled to a second side of the transducer elements via an electrically conductive face, wherein the electrically conductive face serves as a common electrical contact for the transducer elements. The matching layer also comprises kerfs extending to a depth less than the electrically conductive face.

15 Claims, 6 Drawing Sheets

(56) References Cited

U.S. PATENT DOCUMENTS

| | | | |
|---|---|---|---|
| 5,732,706 A | 3/1998 | White et al. | |
| 5,797,845 A * | 8/1998 | Barabash | A61B 8/14 128/916 |
| 5,945,770 A * | 8/1999 | Hanafy | B06B 1/0611 310/322 |
| 6,194,814 B1 * | 2/2001 | Hanafy | G10K 11/006 310/327 |
| 6,359,375 B1 * | 3/2002 | Guo | B06B 1/0622 310/334 |
| 6,558,332 B1 * | 5/2003 | Shimizu | B06B 1/0622 600/437 |
| 6,894,425 B1 | 5/2005 | Solomon | |
| 6,974,417 B2 | 12/2005 | Lockwood et al. | |
| 7,821,180 B2 * | 10/2010 | Kunkel, III | B06B 1/0633 310/322 |
| 2002/0117941 A1 | 8/2002 | Mohr | |
| 2004/0100163 A1 | 5/2004 | Baumgartner et al. | |
| 2004/0113522 A1 * | 6/2004 | Nagahara | G01F 1/662 310/326 |
| 2005/0234341 A1 * | 10/2005 | Oliver | G10K 11/02 600/459 |
| 2007/0182287 A1 | 8/2007 | Lukacs | |
| 2010/0168581 A1 * | 7/2010 | Knowles | G10K 11/02 29/25.35 |
| 2013/0090561 A1 | 4/2013 | Kusukame et al. | |

OTHER PUBLICATIONS

European Patent Application No. 17874075.9, Extended Search Report dated Jun. 19, 2020, 7 pgs.

* cited by examiner

2D ULTRASOUND TRANSDUCER ARRAY AND METHODS OF MAKING THE SAME

FIELD

The present invention relates to ultrasound transducer systems and, in particular, to ultrasound transducer systems employing two-dimensional arrays of transducer elements.

BACKGROUND

Ultrasonic transducer arrays comprise a plurality of transducer elements that transmit and receive ultrasonic energy for imaging a target, such as human tissue. Each transducer element can operate as an independent point source. Accordingly, increasing numbers of transducer elements generally produce higher quality images. However, large numbers of transducer elements can complicate array fabrication resulting from connecting transducer electrodes to system control circuitry. Electrode connections can become especially complex for two-dimensional (2D) transducer element arrays where it is difficult to access interior elements of the array.

SUMMARY

In view of these complexities, ultrasound transducer systems are described herein employing simplified electrical connection architectures for 2D transducer arrays. Briefly, an ultrasound transducer system comprises a two-dimensional array of transducer elements, the transducer elements having a first side comprising individual first electrodes in electrical communication with control circuitry of the ultrasound transducer system. A matching layer is coupled to a second side of the transducer elements via an electrically conductive face, wherein the electrically conductive face serves as a common electrical contact of the transducer elements. In some embodiments, the electrically conductive face is a common electrical contact for individual second electrodes on the second side of the transducer elements. The matching layer also comprises kerfs extending to a depth less than the electrically conductive face.

In another aspect, methods of making ultrasound transducer systems are described herein. In some embodiments, a method comprises providing a two-dimensional array of transducer elements and coupling a first side of the transducer elements to individual contacts in electrical communication with control circuitry of the ultrasound transducer system. A matching layer is coupled to a second side of the transducer elements via an electrically conductive face serving as a common electrical contact of the transducer elements. The matching layer is diced to provide kerfs extending to a depth less than the electrically conductive face.

These and other embodiments are further described in the detailed description which follows.

DETAILED DESCRIPTION

Figure 1:
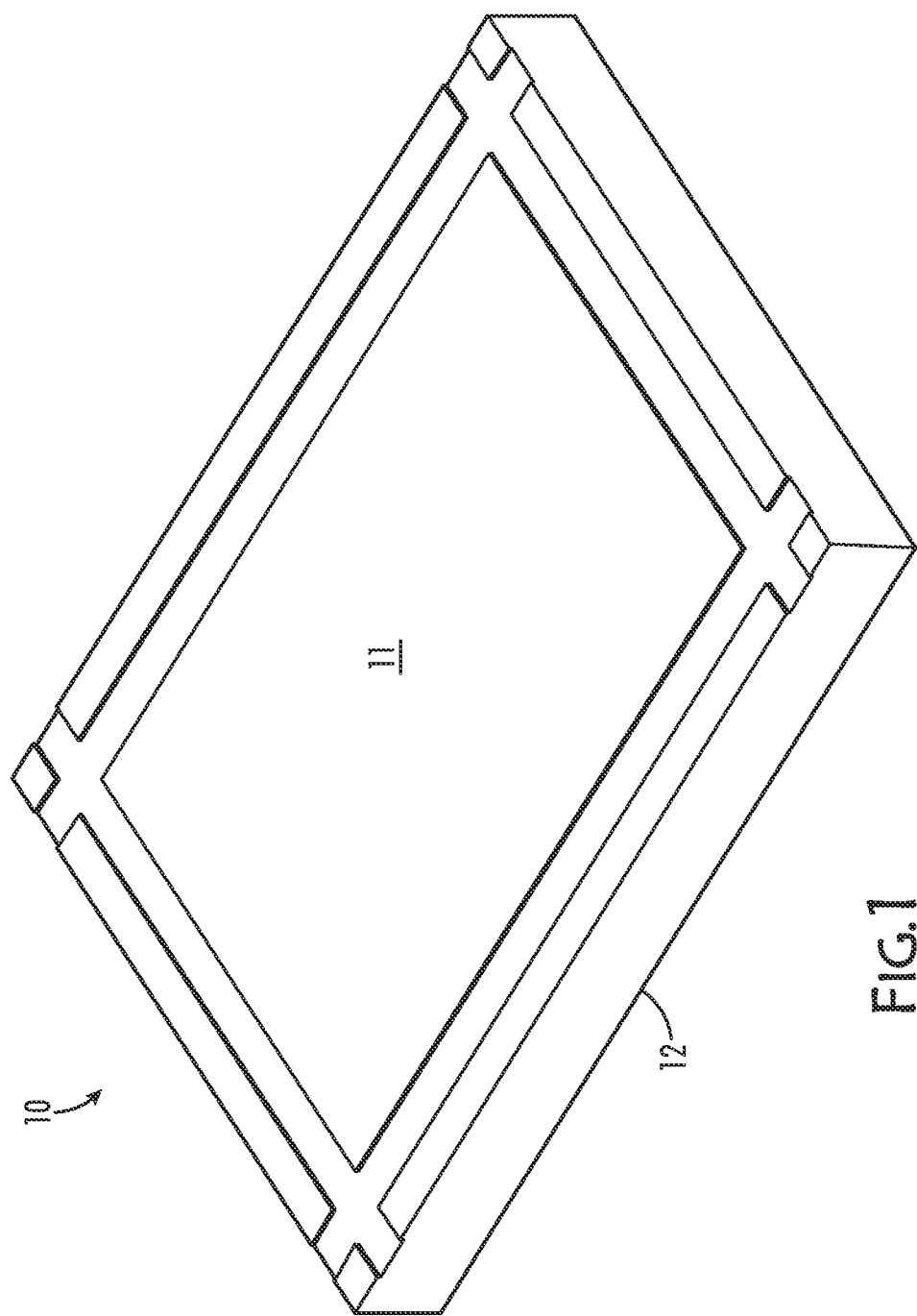
FIG. 1 illustrates a monolithic piezoelectric ceramic plate according to some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, an ultrasound transducer system comprises a two-dimensional array of transducer elements, the transducer elements having a first side comprising individual first electrodes in electrical communication with control circuitry of the ultrasound transducer system. A matching layer is coupled to a second side of the transducer elements via an electrically conductive face, wherein the electrically conductive face serves as a common electrical contact of the transducer elements. The matching layer also comprises kerfs extending to a depth less than the electrically conductive face.

Turning now to specific components, the transducer elements can be formed of any material suitable for ultrasonic applications. In some embodiments, transducer elements are formed of piezoelectric material, including piezoelectric ceramics. For example, transducer elements can be formed of lead zirconate titanate ceramic (PZT). Additional suitable piezoelectric materials can include ceramic epoxy composites and lead magnesium niobate-lead titanate (PMN-PT) single crystals. In other embodiments, transducer elements may comprise a membrane construction. The two-dimensional array can have any desired number of transducer elements. Moreover, the two-dimensional array can be square or rectangular. As described further herein, the transducer elements have a first side comprising individual first electrodes and a second side comprising individual second electrodes. In some embodiments, the individual first and second electrodes can be created during fabrication of the transducer element array. For example, a monolithic plate of ceramic can be metallized on opposing sides. The monolithic plate is subsequently diced to provide the array of transducer elements having individual first and second electrodes on opposing sides. The first electrodes can be coupled to a flexible circuit comprising an array of individual contact pads matching the transducer element array. In some embodiments, the flexible circuit has a construction as set forth in U.S. Pat. No. 9,257,629 which is incorporated herein by reference in its entirety. In some embodiments, the individual contact pads are connected with vias to traces on the side of the flexible circuit distal to the transducer element array. Such traces can continue along the flexible circuit to point where the traces can be electrically connected to the ultrasound system. Further, a backing material can be coupled to the flexible circuit for mechanical support of the transducer element array and to dampen vibrations. In some embodiments, a backing material comprises tungsten loaded epoxy.

A matching layer is coupled the second side of the transducer elements via an electrically conductive face, thereby providing a common electrical contact to the second electrodes. In some embodiments, the matching layer has a thickness of ¼ the desired wavelength. Moreover, the electrically conductive face of the matching layer can comprise any electrically conductive material not inconsistent with the objectives of the present invention. In some embodiments, for example, the face of the matching layer has been metallized to provide the common electrical contact for reconnecting the second electrodes. Metallization of a face of the matching layer can be administered by one or more techniques such physical vapor deposition (PVD) of a metal or alloy layer. In some embodiments, aluminum, transition metal(s) or various alloys can be deposited by PVD to metallize a face of the matching layer. Alternatively, metal or alloy foil can be adhered to the face of the matching layer. In further embodiments, electrically conductive organic materials can be used to provide the electrically conductive face. Conductive polymers, conductive polymeric composites and/or nanoparticle constructions can be applied to the ceramic plate to form the electrically conductive face.

An electrically conductive layer or face can be advantageously thin so as not to interfere with transmission and receipt of ultrasonic waves. In some embodiments, thickness of the layer is less than 0.7 μm or less than 0.5 μm. Moreover, the electrically conductive face provided by metallization permits the remainder of the matching layer to be fabricated of any material having the desired acoustic impedance. In some embodiments, the matching layer exhibits an acoustic impedance of 5-12 MRayls. The matching layer, for example, can be fabricated from one or more electrically insulating polymeric materials such as acrylates, fluoropolymers, siloxanes, polyurethanes or combinations thereof. The matching layer may also be fabricated from epoxy or epoxy composites. In further embodiments, the matching layer can be formed of polymer-nanoparticle composites including silica and/or titania nanoparticle-polymer composites.

The electrically conductive face of the matching layer is in electrical communication with control circuitry of the ultrasound system. One or more electrical traces, for example, can run from the electrically conductive face to the flexible circuit for connection to the ultrasound system. In some embodiments, the electrical traces are in contact with a ground of the control circuitry.

The matching layer also comprises kerfs extending to a depth less than the electrically conductive face. The kerfs can align with cuts defining the two-dimensional array of transducer elements. The kerfs provide acoustic isolation of the transducer array elements without disrupting the common electrical connection between the second electrodes established by the electrically conductive face of the matching layer. Filler material can be positioned in the kerfs for further acoustic isolation. In some embodiments, the electrically conductive face of the matching layer is smaller than the two-dimensional array. In this arrangement, the dicing lines of the transducer array are visible, thereby assisting in properly aligning kerfs of the matching layer.

One or more additional matching layers can be positioned over the matching layer comprising the electrically conductive face. Depending on desired architecture and intended use of the ultrasound system, the one or more additional matching layers can exhibit higher or lower acoustic impedance than the matching layer comprising the electrically conductive face.

In another aspect, methods of making ultrasound transducer systems are described herein. In some embodiments, a method comprises providing a two-dimensional array of transducer elements and coupling a first side of the transducer elements to individual contacts in electrical communication with control circuitry of the ultrasound transducer system. A matching layer is coupled to a second side of the transducer elements via an electrically conductive face serving as a common electrical contact of the transducer elements. The matching layer is diced to provide kerfs extending to a depth less than the electrically conductive face. Ultrasound transducer systems fabricated according to methods described herein can have any of the properties and/or architectures detailed above.

Figure 2B:
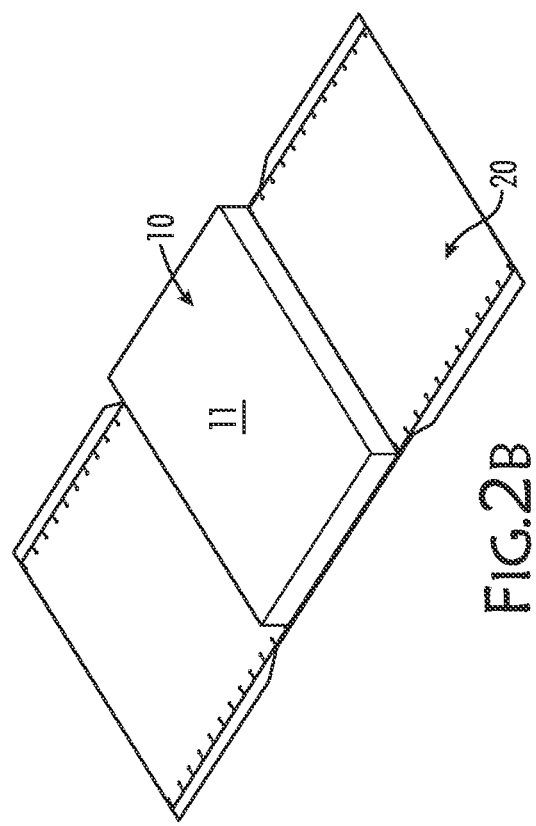
FIG. 2(a) and FIG. 2(b) illustrate bonding a ceramic plate to a flexible circuit according to some embodiments.
Figure 2A:
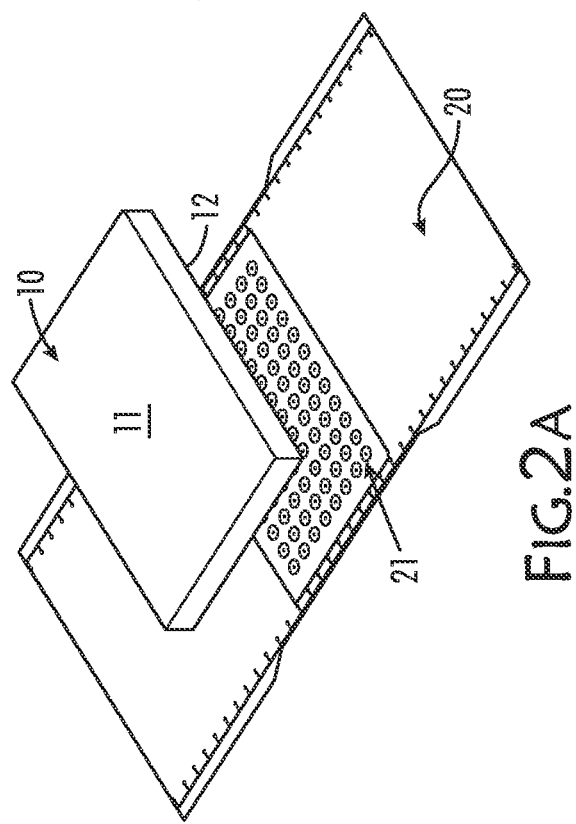
Figure 3:
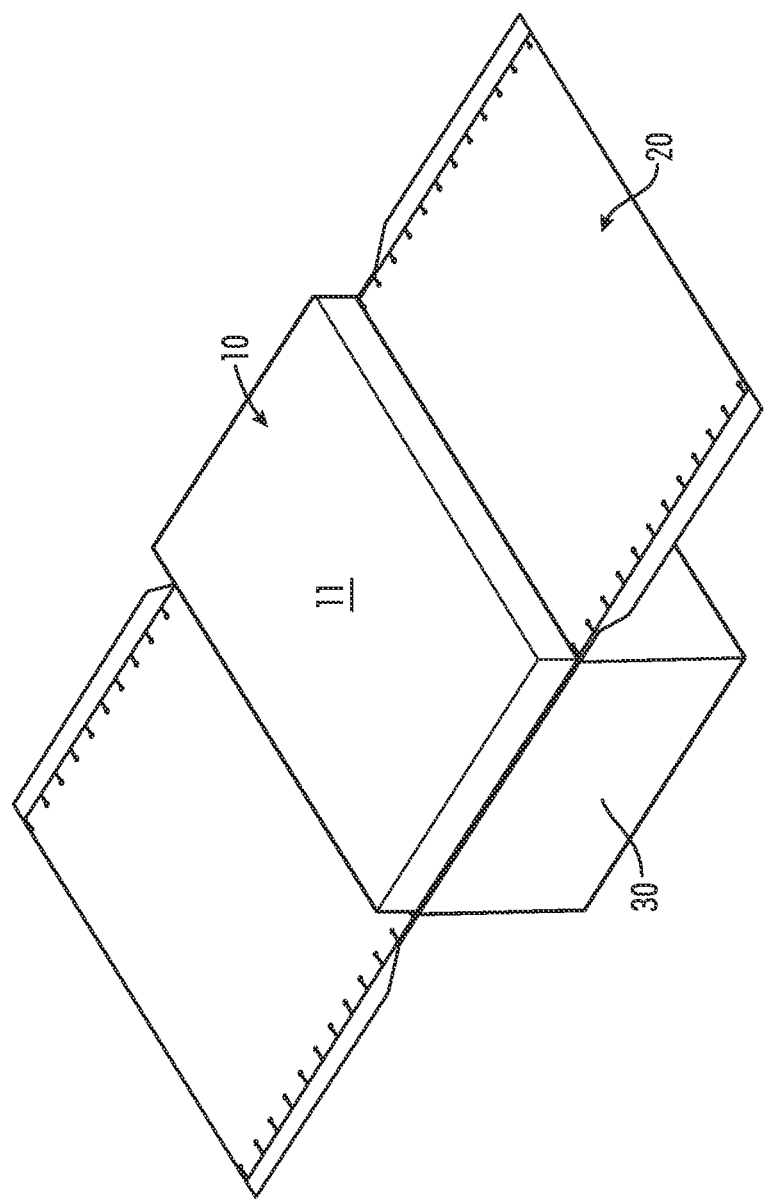
FIG. 3 illustrates bonding a backing material to a flexible circuit according to some embodiments.
Figure 4:
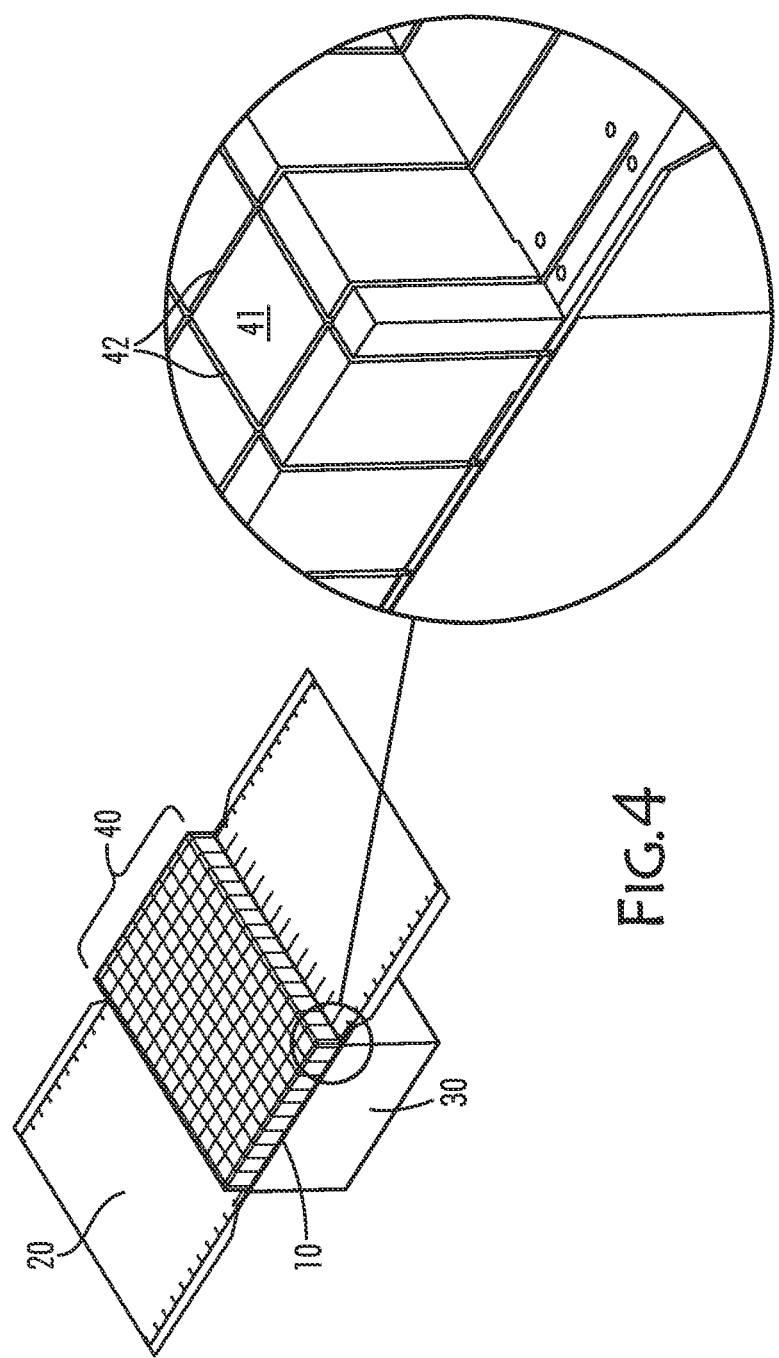
FIG. 4 illustrates dicing a monolithic ceramic plate to form a two-dimensional transducer element array according to some embodiments.
Figure 5:
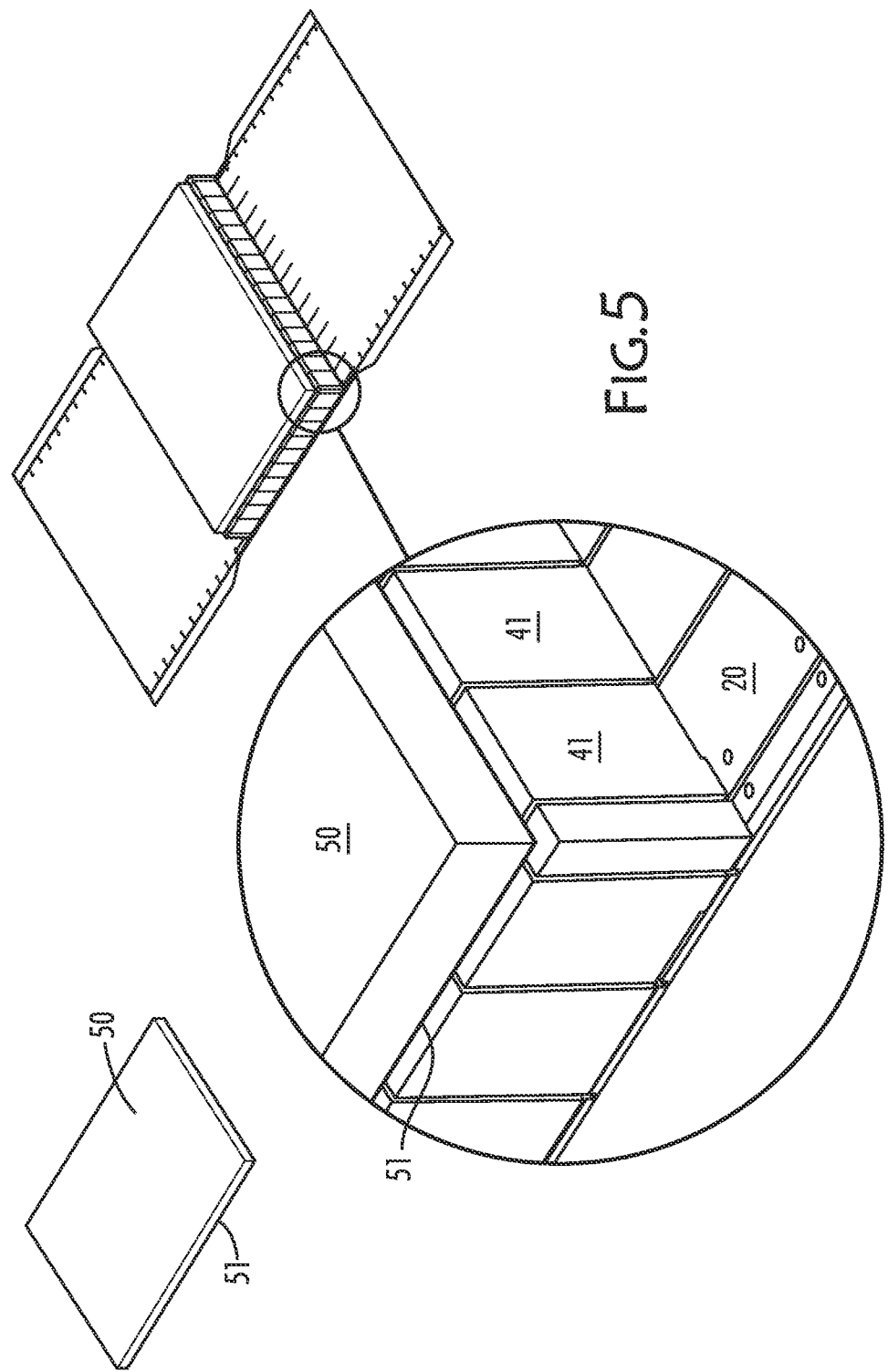
FIG. 5 illustrates coupling a matching layer to a second side of transducer elements via an electrically conductive face of the matching layer according to some embodiments.

One method of making an ultrasound transducer system is now described with reference to FIGS. 1-6. As illustrated in FIG. 1, a monolithic plate 10 of piezoelectric ceramic material is provided. The monolithic plate 10 comprises a metal or alloy layer on top 11 and bottom 12 faces and along the four edges. The metal or alloy layers can serve as electrodes or contacts. Referring now to FIGS. 2(a)-(b), a flexible circuit 20 is bonded to the non-patient side or bottom face 12 of the ceramic plate 10. The flexible circuit 20 comprises pads 21 connected with vias to traces on the side of the flexible circuit 20 distal to the monolithic ceramic plate 10. These traces continue along the flex circuit to a point where the traces are electrically connected to ultrasound system electronics. The electrical pads 21 are arranged in an array mirroring the transducer element array to be fabricated from the monolithic ceramic plate 10. A backing material 30 is bonded to the flexible circuit 20 as illustrated in FIG. 3. The backing material 30 can provide mechanical support and dampen vibrations during operation of the transducer. Patterned cuts 42 are subsequently made in the monolithic ceramic plate 10 to define the two-dimensional array 40 of transducer elements 41 as provided in FIG. 4. The cuts 42 can also extend into, but not through, the flexible circuit 20. The cuts 42 are filled with an acoustically isolating material to permit independent operation of the transducer elements 41. Referring now to FIG. 5, a matching layer 50 is provided and coupled to the second side of the transducer elements 41 via an electrically conductive face 51. The electrically conductive face 51 serves as a common electrical contact for the second electrodes of the transducer elements 41 and collective connects the second electrodes to an area outside of the active area. Electrical connections outside the active area can be wrapped around to the flexible circuit side of the transducer array 40 where the connections can interface with a ground trace or layer in the flexible circuit.

Figure 6:
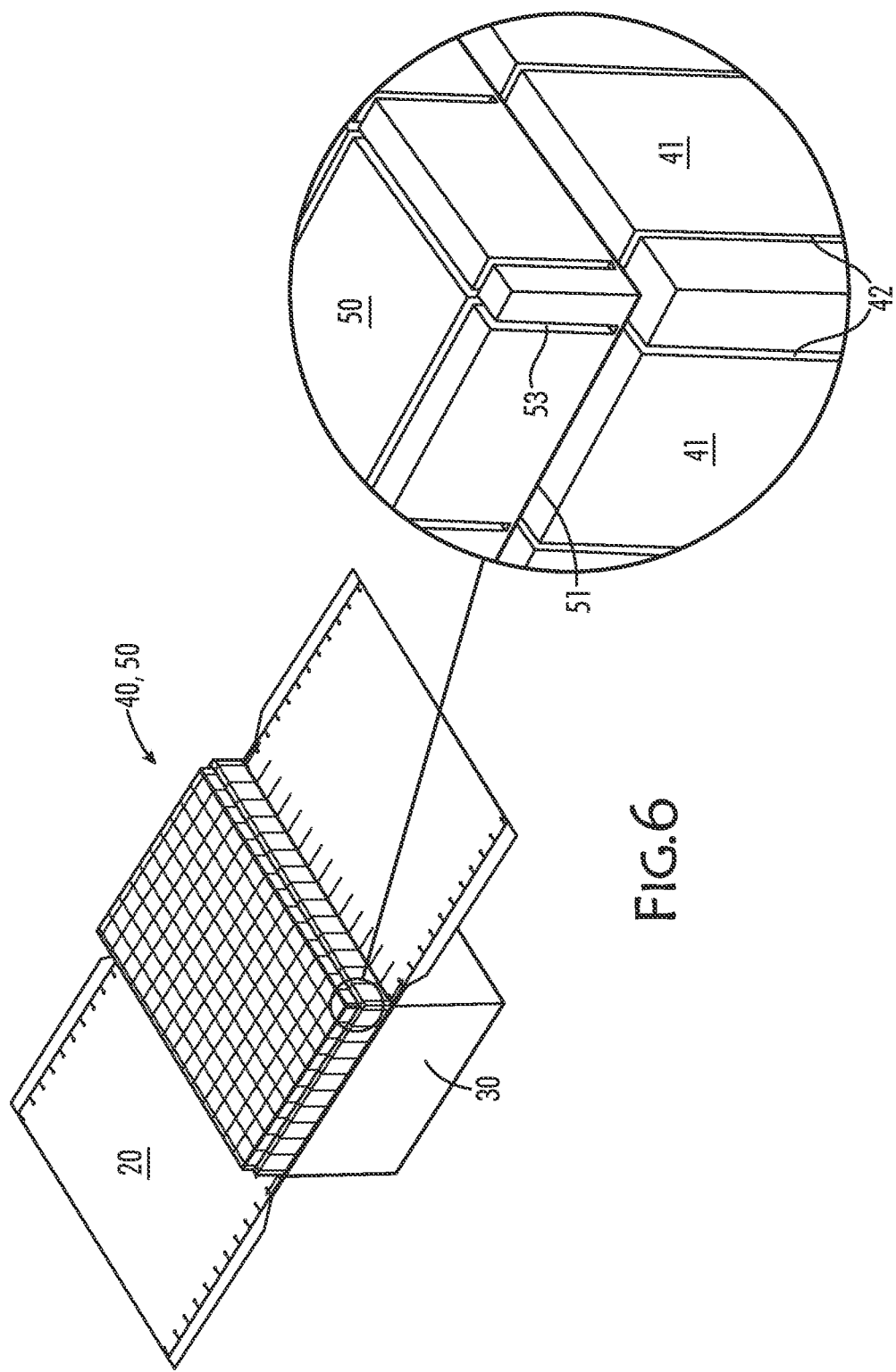
FIG. 6 illustrates dicing the matching layer to provide kerfs extending to a depth less than the electrically conductive face according to some embodiments.

In the embodiment of FIG. 5, the matching layer 50 is undersized relative to the two-dimensional transducer array 40 to facilitate aligning kerfs in the matching layer with cuts 42 defining the transducer elements 41. The matching layer 50 is subsequently diced to provide the kerfs 53 extending to a depth less than the electrically conductive face 51 as illustrated in FIG. 6. The kerfs can be filled with acoustically isolating material to facilitate independent operation of the transducer elements 41.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An ultrasound transducer system comprising:
a two-dimensional array of transducer elements defined by cuts, the transducer elements having a first side comprising individual electrodes in electrical communication with control circuitry of the ultrasound transducer system via a flexible circuit and having a second side, opposite the first side;
a backing material covering the flexible circuit, wherein the flexible circuit is disposed between the backing material and the first side of the two-dimensional array of transducer elements; and,
a matching layer coupled to the second side of the transducer elements,
wherein the matching layer is coupled to the second side of the transducer elements by an electrically conductive face providing a common electrical contact for the transducer elements defining an active area and collectively connecting the transducer elements to an area outside of the active area, and
wherein electrical connections of the second side which are not within the active area are wrapped around to the flexible circuit side of the transducer array, and
wherein the matching layer comprises kerfs extending to a depth less than the electrically conductive face wherein the kerfs align with cuts defining the two-dimensional array of transducer elements, and
wherein the electrically conductive face has an area that is smaller than an area of the second side of the two-dimensional array of transducer elements to facilitate aligning the kerfs of the matching layer with the cuts of the two-dimensional array of transducer elements while also enabling the wrapping of the electrical connections outside of the active area around to the flexible circuit side of the transducer array.

2. The ultrasound transducer system of claim 1, wherein the kerfs are patterned.

3. The ultrasound transducer system of claim 1, wherein the transducer elements are ceramic.

4. The ultrasound transducer system of claim 1, wherein the common electrical contact is in electrical communication with a ground of the flexible circuit.

5. The ultrasound transducer system of claim 1, wherein filler is positioned in the kerfs.

6. The ultrasound transducer system of claim 1, wherein the electrically conductive face comprises a metal or alloy layer having thickness less than 0.7 μm.

7. The ultrasound transducer system of claim 1 further comprising one or more additional matching layers positioned over the matching layer coupled to the second side of the transducer elements.

8. The ultrasound transducer system of claim 1, wherein the flexible circuit comprises a flexible circuit pad covering the individual electrodes.

9. A method of making an ultrasound transducer system comprising:
providing a two-dimensional array of transducer elements defined by cuts, the transducer elements having a first side and a second side;
coupling a first side of the transducer elements to individual contacts in electrical communication with control circuitry of the ultrasound transducer system via a flexible circuit;
coupling a backing material to the flexible circuit, wherein the flexible circuit is disposed between the backing material and the first side of the two-dimensional array of transducer elements;
coupling a matching layer to the second side of the transducer elements via the electrically conductive face serving as a common electrical contact of the transducer elements defining an active area and collectively connecting the transducer elements to an area outside of the active area;
dicing the matching layer to provide kerfs extending to a depth less than the electrically conductive face wherein the kerfs align with the cuts defining the two-dimensional array of transducer elements; and,
wrapping electrical connections of an electrically conductive face serving as a common electrical contact of the transducer elements outside an active area on the second side of the transducer elements around to the flexible circuit side of the transducer array,
wherein the electrically conductive face has an area that is smaller than an area of the second side of the two-dimensional array of transducer elements to facilitate aligning the kerfs of the matching layer with the cuts of the two-dimensional array of transducer elements during the dicing while also enabling the wrapping of the electrical connections outside of the active area around to the flexible circuit side of the transducer array.

10. The method of claim 9, wherein the kerfs are patterned.

11. The method of claim 9 further comprising positioning filler material in the kerfs.

12. The method of claim 9, wherein the flexible circuit comprises a flexible circuit pad.

13. The method of claim 9 further comprising electrically connecting the electrically conductive face with the control circuitry.

14. The method of claim 13, wherein the electrically conductive face is electrically connected to one or more ground traces disposed in a flexible circuit of the control circuitry.

15. The method of claim 9 further comprising positioning one or more additional matching layers over the matching layer coupled to the second side of the transducer elements.

* * * * *